United States Patent
Kita et al.

(10) Patent No.: US 9,436,996 B2
(45) Date of Patent: Sep. 6, 2016

(54) RECORDING MEDIUM STORING IMAGE PROCESSING PROGRAM AND IMAGE PROCESSING APPARATUS

(71) Applicants: Koji Kita, Wakayama (JP); Tomoo Nakano, Wakayama (JP)

(72) Inventors: Koji Kita, Wakayama (JP); Tomoo Nakano, Wakayama (JP)

(73) Assignee: Noritsu Precision Co., Ltd., Wakayama (JP)

( * ) Notice: Subject to any disclaimer, the term of this patent is extended or adjusted under 35 U.S.C. 154(b) by 188 days.

(21) Appl. No.: 13/935,919

(22) Filed: Jul. 5, 2013

(65) Prior Publication Data

US 2014/0016815 A1    Jan. 16, 2014

(30) Foreign Application Priority Data

Jul. 12, 2012  (JP) .................................. 2012-156660
Feb. 27, 2013  (JP) .................................. 2013-036878

(51) Int. Cl.
*G06K 9/00*    (2006.01)
*G06T 7/00*    (2006.01)
*G06T 7/20*    (2006.01)

(52) U.S. Cl.
CPC ........... *G06T 7/0022* (2013.01); *G06T 7/2053* (2013.01); *G06T 2207/10016* (2013.01); *G06T 2207/10024* (2013.01); *G06T 2207/20224* (2013.01); *G06T 2207/30232* (2013.01)

(58) Field of Classification Search
None
See application file for complete search history.

(56) References Cited

U.S. PATENT DOCUMENTS

| | | | | |
|---|---|---|---|---|
| 5,751,345 A | * | 5/1998 | Dozier | G08B 13/19641 348/153 |
| 5,969,755 A | * | 10/1999 | Courtney | G06F 17/3079 348/135 |
| 6,335,985 B1 | * | 1/2002 | Sambonsugi | G06K 9/3241 382/190 |
| 7,095,786 B1 | * | 8/2006 | Schonfeld | G06T 7/2006 375/240.16 |
| 7,142,600 B1 | * | 11/2006 | Schonfeld | G06T 7/2006 375/240.16 |
| 7,426,313 B2 | * | 9/2008 | Shohdohji | H04N 19/80 375/E7.19 |

(Continued)

FOREIGN PATENT DOCUMENTS

JP    H09154125 A    6/1997
JP    2001333417 A   * 11/2001

(Continued)

*Primary Examiner* — Chan Park
*Assistant Examiner* — Iman K Kholdebarin
(74) *Attorney, Agent, or Firm* — St. Onge Steward Johnston & Reens LLC

(57) ABSTRACT

A recording medium storing an image processing program according to one aspect of the present invention is a non-transitory computer-readable medium storing an image processing program to make a computer execute image processing on an image group on one timeline, the image processing program making the computer execute deriving a difference value that is based on a difference between pixel values of images that are adjacent in time series in the image group, and displaying a time-series difference image showing a time-series change in the difference value.

10 Claims, 16 Drawing Sheets

(56) References Cited

U.S. PATENT DOCUMENTS

| | | | |
|---|---|---|---|
| 7,595,833 B2* | 9/2009 | Calisa | G08B 13/19656 348/333.01 |
| 7,747,085 B2* | 6/2010 | Kostrzewski | G06T 9/001 382/232 |
| RE42,790 E* | 10/2011 | Schonfeld | G06T 7/2006 375/240.16 |
| 8,106,921 B2* | 1/2012 | Nystad | H04N 19/43 345/555 |
| 8,200,020 B1* | 6/2012 | Geiss | G06K 9/00979 382/190 |
| 8,887,050 B1* | 11/2014 | Siracusano, Jr. | G06F 3/0481 715/716 |
| 2001/0013952 A1* | 8/2001 | Boon | H04N 19/507 375/240.08 |
| 2001/0024513 A1* | 9/2001 | Miyatake | G06K 9/3241 382/103 |
| 2002/0037770 A1* | 3/2002 | Paul | A63F 13/10 463/36 |
| 2002/0126876 A1* | 9/2002 | Paul | G06F 3/017 382/104 |
| 2004/0057631 A1* | 3/2004 | Kim | G06T 5/50 382/268 |
| 2004/0101162 A1* | 5/2004 | Higaki | G01C 11/00 382/103 |
| 2005/0041156 A1* | 2/2005 | Kondo | H04N 5/145 348/700 |
| 2005/0184949 A1* | 8/2005 | Kamimura | G09G 3/3648 345/98 |
| 2006/0062299 A1* | 3/2006 | Park | H04N 19/139 375/240.12 |
| 2006/0171596 A1* | 8/2006 | Sung | H04N 19/105 382/232 |
| 2006/0210124 A1* | 9/2006 | Ishii | G06K 9/00255 382/118 |
| 2007/0061696 A1* | 3/2007 | Vallone | G06F 17/3079 715/255 |
| 2007/0146380 A1* | 6/2007 | Nystad | H04N 19/43 345/582 |
| 2007/0174774 A1* | 7/2007 | Lerman | G06F 17/30017 715/723 |
| 2007/0177815 A1* | 8/2007 | Yang | B60R 1/00 382/254 |
| 2007/0201746 A1* | 8/2007 | Kim | H04N 5/147 382/190 |
| 2007/0222895 A1* | 9/2007 | Yamauchi | H04N 5/445 348/701 |
| 2007/0268364 A1* | 11/2007 | Neff | G06T 7/2006 348/143 |
| 2008/0129875 A1* | 6/2008 | Lei | H04N 5/144 348/700 |
| 2008/0147267 A1* | 6/2008 | Plante | G07C 5/008 701/33.4 |
| 2008/0181515 A1* | 7/2008 | Kondo | G11B 27/02 382/232 |
| 2008/0273741 A1* | 11/2008 | Fujii | G06T 1/0028 382/100 |
| 2008/0291333 A1* | 11/2008 | Subbotin | H04N 5/23248 348/700 |
| 2008/0310510 A1* | 12/2008 | Hiwasa | H04N 9/8042 375/240.16 |
| 2009/0060447 A1* | 3/2009 | Nakao | H04N 5/232 386/354 |
| 2010/0053321 A1* | 3/2010 | Kim | H04N 5/144 348/135 |
| 2010/0128126 A1* | 5/2010 | Takeuchi | G08B 13/1961 348/143 |
| 2010/0201889 A1* | 8/2010 | Paschalakis | H04N 5/147 348/700 |
| 2010/0271515 A1* | 10/2010 | Imagawa | H04N 5/144 348/266 |
| 2010/0290710 A1* | 11/2010 | Gagvani | G06T 7/2053 382/224 |
| 2012/0177249 A1* | 7/2012 | Levy | G06K 9/325 382/103 |
| 2012/0218372 A1* | 8/2012 | Zhan | H04M 3/5232 348/14.01 |
| 2012/0249826 A1* | 10/2012 | Kobayashi | G06K 9/036 348/222.1 |
| 2013/0113939 A1* | 5/2013 | Strandemar | G06T 5/10 348/164 |
| 2013/0156158 A1* | 6/2013 | Noji | A61B 5/08 378/62 |
| 2013/0195355 A1* | 8/2013 | Kita | G06T 5/002 382/167 |
| 2014/0019864 A1* | 1/2014 | Kita | G06F 3/0484 715/725 |
| 2014/0218529 A1* | 8/2014 | Mahmoud | H04N 7/181 348/148 |
| 2014/0241701 A1* | 8/2014 | Nakano | H04N 9/8205 386/281 |
| 2015/0125032 A1* | 5/2015 | Yamanaka | H04N 5/232 382/103 |
| 2015/0154460 A1* | 6/2015 | Baba | G06T 7/0083 382/104 |

FOREIGN PATENT DOCUMENTS

| | | | |
|---|---|---|---|
| JP | 2004157879 A | * | 6/2004 |
| JP | 2010014135 A | | 1/2010 |
| JP | 2010033527 A | | 2/2010 |
| JP | 2010087769 A | | 4/2010 |

* cited by examiner (a) 0 sec (b) 0.5 sec (c) 1 sec (d) 1.5 sec (e) 2 sec (f) 2.5 sec (g) 3 sec (h) 3.5 sec (i) 4 sec (j) 4.5 sec (k) 5 sec (l) 5.5 sec (a)

(b)

Image processing is perfomed only on this portion

RECORDING MEDIUM STORING IMAGE PROCESSING PROGRAM AND IMAGE PROCESSING APPARATUS

TECHNICAL FIELD

The present invention relates to a recording medium storing an image processing program and to an image processing apparatus.

BACKGROUND ART

Security cameras are typically used for fixed point surveillance performed over an extended period of time, and various types have been proposed (e.g., JP H09-154125A).

Incidentally, when analyzing moving images captured by such security cameras, in order to find important information on criminals or the like, it is necessary to check the moving image over its full recording time and find places where changes have occurred. However, moving images recorded by such security cameras tend to span periods of several hours or several days rather than short periods of time, and viewing the whole moving image not only requires a considerable amount of time but places a large burden on the person doing the checking. This is not only a problem for moving images captured by security cameras but is also a potential problem for all extended moving images that are checked for places where changes occur.

SUMMARY OF INVENTION

A recording medium storing an image processing program according to one aspect of the present invention is a non-transitory computer-readable medium storing an image processing program to make a computer execute image processing on an image group on one timeline, the image processing program making the computer execute deriving a difference value that is based on a difference between pixel values of images that are adjacent in time series in the image group, and displaying a time-series difference image showing a time-series change in the difference value.

According to this configuration, difference values based on the differences between the pixel values of images on a timeline that are adjacent in time series are derived, and a time-series difference image showing the change in difference values is displayed by arranging these difference values in time series. Here, since the difference value is based on the difference between the pixel values of adjacent images, there will be a large change between adjacent images if the absolute value of this difference value is large. Thus, displaying the time-series difference image enables places where there is a large change between images to be easily spotted on the timeline. Accordingly, it is possible to focus checking on only places where there is a large change between images on the timeline, and the burden involved in checking an entire moving image spanning an extended period of time can be reduced. Thus, by using such an image processing program stored on a recording medium in the analysis of a moving image captured by a security camera used in fixed point surveillance, for example, it is possible to easily extract only places where a change occurs in the moving image, without checking the full recording time. As a result, it is possible to not only shorten the checking time but also to greatly reduce the checker's workload. Note that the difference value may be a numerical value obtained by directly using the derived difference, or may be a numerical value obtained by processing the numerical value that is directly derived. Also, the time-series difference image may be an image directly showing the change in difference values, or may be an image showing the change in numerical values obtained by processing the difference values.

The image processing program can be further provided with a step of displaying a timeline image corresponding to the timeline and in time series, and a step of displaying, when an input selecting an arbitrary position on the timeline image is received, an image on the timeline corresponding to the selected position, and in the step of displaying the time-series difference image, the time-series difference image can be displayed so as to correspond to the timeline image and in time series.

According to this configuration, since a timeline image is displayed, a corresponding image can be displayed by the user selecting an arbitrary position of this timeline image. Since this timeline image and the time-series difference image are configured to correspond to each other, if, for example, a place having a large difference value is found in time-series difference image and the corresponding position on the timeline image is selected, an image of the place where there is a large change on the timeline can be immediately checked.

Also, the image processing program may be further provided, with a step of receiving designation of a color from a user, and a range over which images containing a pixel of the designated color exist on the timeline may be shown on the timeline image. When a timeline image is thus displayed, the user is able to designate positions on the timeline at which images containing the designated color exist. Here, since the timeline image and the time-series difference image are associated with each other, the user can be informed as to whether a color that is focused on exists where there is a change between images.

The abovementioned difference value can be derived by a variety of methods, and can, for example, be derived based on a largest difference between the pixel values of corresponding positions in adjacent images. Deriving the difference value in this way facilitates extraction of a change that occurs in part of an image.

Alternatively, the difference between the pixel values of corresponding positions in adjacent images can be derived, and the difference value can be derived based on an average value obtained by averaging the differences of all the positions. Deriving the difference value in this way facilitates extraction of a change that occurs over a large area of an image, even if the change is slight change.

Accordingly, the user need only select one of the abovementioned difference values or preset one of these difference values, according to the application.

Also, in the abovementioned image processing program, a configuration can be adopted in which the difference value is selectable from at least one of a first difference value that is derived based on a largest difference between the pixel values of corresponding positions in the adjacent images, and a second difference value that is derived based on an average value obtained by deriving the difference between the pixel values of corresponding positions in the adjacent images and averaging the differences of all the positions, and a step of receiving selection, from the user, of one of the first difference value and the second difference value can be further provided, prior to the step of displaying the time-series difference image.

The user is thereby able to select either the first difference value or the second difference value according to the application, and cause the time-series difference image to be displayed, based on the selected difference value.

The time-series difference image can be presented in various modes, and can, for example, be represented by a graph. Adopting this configuration enables places where there is a large change and places where there is a small change to be confirmed at a glance. Various types of graphs other than a line graph can be used, such as a bar graph. Apart from a graph, an image in which numerical values of the difference values are arranged, for example, can also be used.

Also, a step of receiving designation, from a user, of an area on which to perform image processing in an image may be further provided, and the difference values in the designated area of the image may be derived. Adopting this configuration results in the time-series difference image being displayed based on the difference values derived in the area designated by the user. Thus, by specifying an area to be focused on in an image, the use is able to easily detect places where a change has occurred in that area.

Also, in the case where images included in the image group are provided by color images, the difference values may be derived without focusing on a specific color. Deriving the difference values in this way enables the change in pixel values to be extracted without being restricted to a specific color.

Also, in the case where images included in the image group are provided by color images, the difference value may be derived by focusing on a specific color. Deriving the difference values in this way enables the change in pixel values to be extracted by focusing on a specific color.

Also, in the case where images included in the image group are provided by color images, a step of receiving selection, from a user, of a specific color to be focused on in order to derive the difference values may be further provided, and the difference values may be derived by focusing on the selected specific color. Deriving the difference value in this way enables the change in pixel values to be extracted based on a specific color that the user focuses on in an image.

Also, in the case where images included in the image group are provided by color images, a step of receiving selection, from a user, of whether to focus on a specific color in order to derive the difference values may be further provided. Then, in the case where the user selects not to focus on a specific color in order to derive the difference values, the difference values may be derived without focusing on a specific color, and in the case where the use selects to focus on a specific color in order to derive the difference values, the difference values may be derived by focusing on a specific color designated by the user in the selection. Adopting this configuration enables a change in pixel values to be extracted according to the application of the user.

An image processing apparatus according to one aspect of the present invention is an image processing apparatus for performing image processing on an image group on one timeline that is provided with an image processing unit to derive a difference value that is based on a difference between pixel values of images that are adjacent in time series in the image group, and generate a time-series difference image showing a time-series change in the difference value, and a display unit to display the time-series difference image.

The objects and advantages of the invention will be realized and attained by means of the elements and combinations particularly pointed out in the claims.

It is to be understood that both the forgoing general description and the following detailed description are excemplary and explanatory and are not restrictive of the invention as claimed.

DESCRIPTION OF EMBODIMENTS

Figure 1:
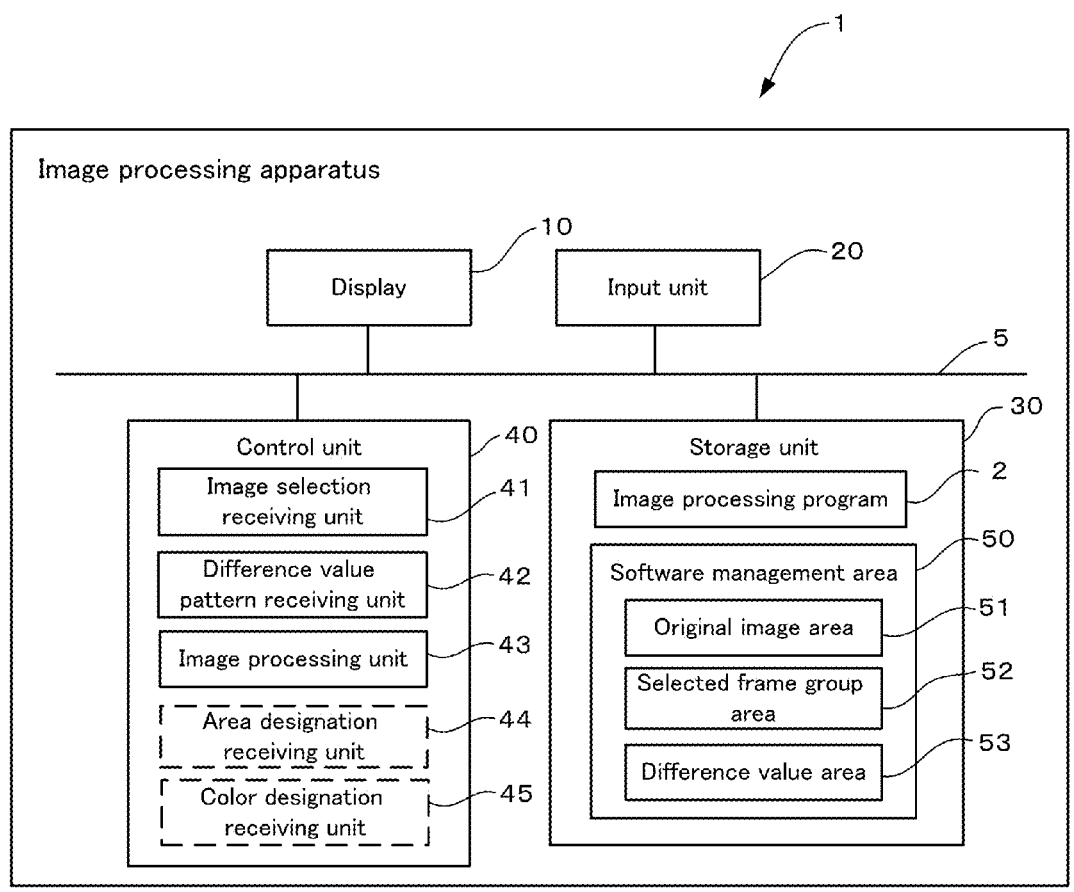
FIG. 1 is a block diagram of an image processing apparatus according to an embodiment of the present invention.

Hereinafter, an image processing program and an image processing apparatus according to an embodiment of the present invention will be described, with reference to the drawings. FIG. 1 is a block diagram of the image processing apparatus according to an embodiment of the present invention. The image processing program and the image processing apparatus according to the present embodiment are for converting changes in an image group on a timeline into a graph. Note that, hereinafter, an image to be image processed may be called a frame, a frame image, or simply an image.

1. Overview of Image Processing Apparatus

As shown in FIG. 1, a general-purpose personal computer can be used as an image processing apparatus 1 according to the present embodiment. An image processing program 2 that is an embodiment of the image processing program according to the present invention is installed on this image processing apparatus 1. The image processing program 2 is application software for supporting image processing on moving images and still images, and causes the image processing apparatus 1 to execute steps included in operations which will be discussed later.

The image processing apparatus 1 has a display 10, an input unit 20, a storage unit 30, and a control unit 40, and these units are connected by a bus line 5 so as to be mutually communicable. In the present embodiment, the display 10 is a liquid crystal display, and displays screens and the like which will be discussed later to the user. The input unit 20 is constituted by a mouse, a keyboard and the like, and receives operations on the image processing apparatus 1 from the user. Also, the storage unit 30 is constituted by a nonvolatile hard disk or the like, and the control unit 40 is constituted by a CPU, a ROM, volatile RAM, and the like.

The image processing program 2 and a software management area 50 are secured in the storage unit 30. This software management area 50 is an area used by the image processing program 2. Also, an original image range 51, a selected frame group area 52 and a difference value area 53 are secured in the software management area 50. The role of each of the areas 51 to 53 will be discussed later.

The control unit 40 operates in a virtual manner as an image selection receiving unit 41, a difference value pattern receiving unit 42, and an image processing unit 43, by reading out and executing the image processing program 2 stored in the storage unit 30. Also, the control unit 40 may further operate in a virtual manner as at least one of an area designation receiving unit 44 and a color designation receiving unit 15, by reading out and executing the image processing program 2 stored in the storage unit 30. The operation of each of the units 41 to 45 will be discussed later.

Figure 2:
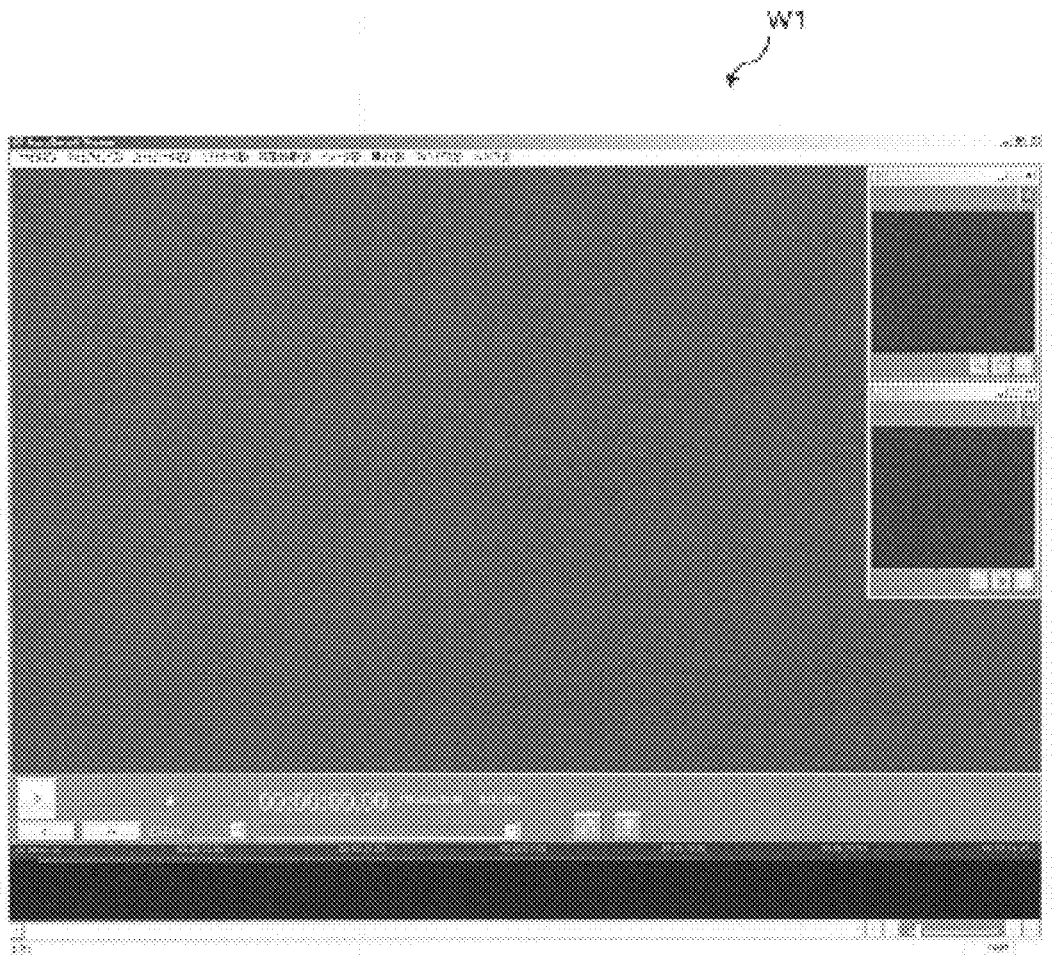
FIG. 2 is a diagram of a basic screen before image data is imported.

2. Detailed Description of Configuration and Operations of Image Processing Apparatus The control unit 40 starts the image processing program 2, on detecting that the user has performed a predetermined operation via the input unit 20. When the image processing program 2 has been started, a basic screen W1 shown in FIG. 2 is displayed on the display 10. Note that the control unit 40 controls display of screens, windows, buttons and all other elements that are displayed on the display 10.

2-1. Import of Image Data

The basic screen W1 receives an instruction to import image data to an original image area 51 from a user. Image data imported to the original image area 51 is targeted for image processing which will be discussed later. The control unit 40 imports image data to the original image area 51 from a still image file or a moving image file. Note that, in this specification, still image files are data files in a still image format, and moving image files are data files in a moving image format.

In the case of importing image data from a still image file, the user specifies one still image file or one folder, by operating the input unit 20. In the case of the former, the control unit 40 allows the user to input an address path and filename of that still image file in the storage unit 30. In the case of the latter, the control unit 40 allows the user to input an address path and a folder name of that folder in the storage unit 30. Thereafter, the control unit 40 saves the one specified still image file or all the still image files in the one specified folder as a still image file group in the original image area 51.

On the other hand, in the case of importing image data from a moving image file, the user inputs an address path and a filename of that one moving image file in the storage unit 30, by operating the input unit 20. The control unit 40 will display a moving image import window (not shown) in a superimposed manner on the basic screen W1, when it detects that the user specified the moving image file. A moving image import window receives selection of a timeline of arbitrary length from the user, from among all timelines of the specified moving image file. The control unit 40, on detecting that the user has selected a timeline of arbitrary length via the input unit 20, generates a still image file group corresponding to the selection. This still image file group corresponds one-to-one with the frame group included in the moving image of the timeline related to the user's selection. Thereafter, the control unit 40 saves this still image file group in the original image area 51.

Accordingly, in the present embodiment, a still image file rather than a moving image file is targeted for image processing discussed later. A still image file is imported to the original image area 51 in units of files or folder, or in full or partial units of the timeline of a moving image file.

2-2. Playback of Still Image File Group

Figure 3:
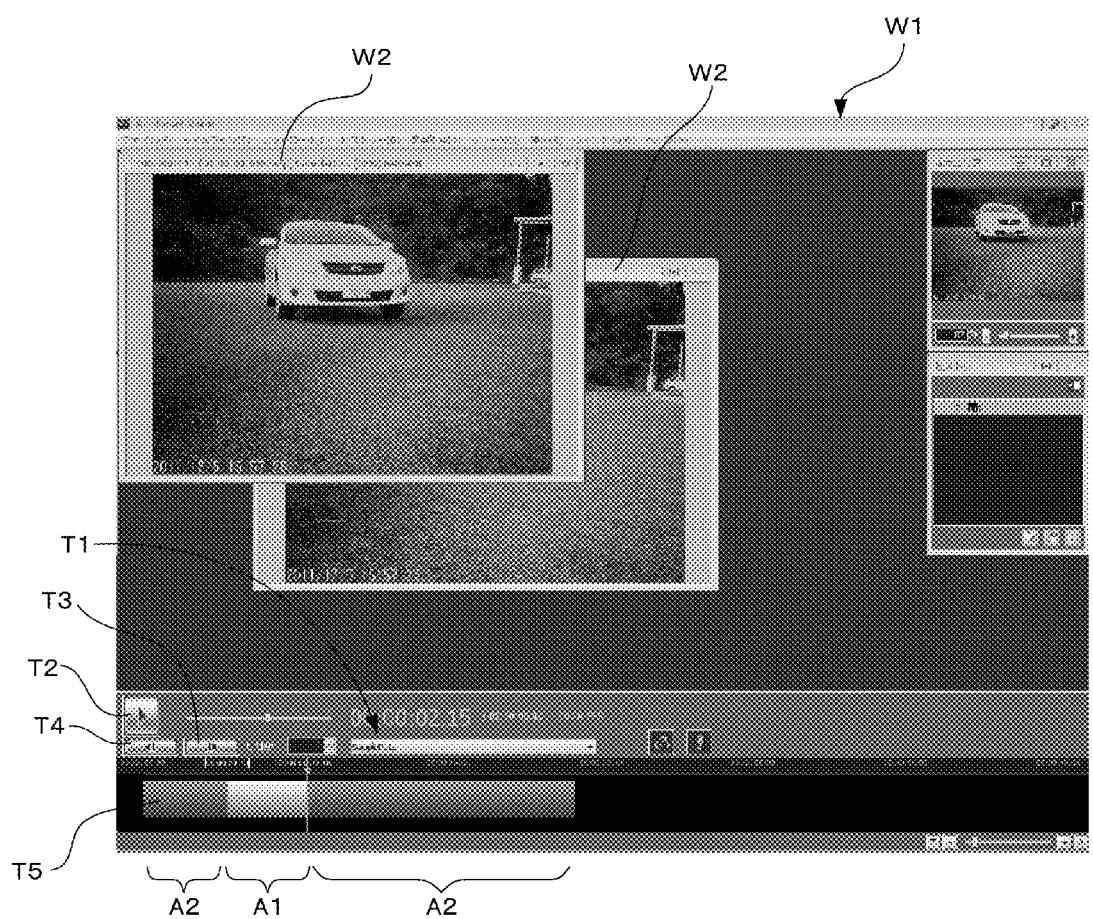
FIG. 3 is a diagram of the basic screen after image data has been imported.

When a still image file group has been imported to the original, image area 51, the control unit 40 displays display windows W2 on the basic screen W1 in a superimposed manner, as shown in FIG. 3. The same number of display windows W2 as the number of operations for importing still image file groups to the original image area 51 is displayed.

First, one still image file included in the still image file group imported to the original image area 51 (e.g., still image file corresponding to first frame in timeline) is displayed in the display window W2. Note that the control unit 40 recognizes the still image file included in the still image file group as being a still image file that is arranged in the timeline, even though the still image file group originates from still image files rather than from moving image files. The arrangement is automatically judged from the attributes of the file (filename, created on date/time, updated on date/time, etc).

As will be discussed later, the frame displayed in the display window W2 chances in response to an operation by the user. The control unit 40 manages identification information of the frame currently displayed in the display window W2 in real time.

The control unit 40 can playback the still image file group corresponding to the display window W2 as a moving image in the display window W2. As shown in FIG. 3, a window selection pull-down menu T1, a play button T2, a frame advance button T3, a frame reverse button T4, and a timeline bar T5 are arranged on the basic screen W1.

Even if there are multiple display windows W2, there is only one active display window W2. The control unit 40 receives selection of which display window W2 to activate from the user via the window selection pull-down menu T1. Hereinafter, the still image file group corresponding to the active display window W2 is called an active file group. Also, the frame currently displayed in the active display window W2 is called an active display frame.

The play button T2 receives an instruction to playback the active file group as a moving image from the user. The control unit 40, on detecting that the user has pressed the play button T2 via the input unit 20, displays frames of the active file group sequentially along the timeline in the active display window W2 in frame advance format. Note that playback starts from the active display frame at the point in time when the play button T2 is pressed. Also, the play button T2 receives an instruction to stop playback from the user. The control unit 40, on detecting that the user has pressed the play button T2 via the input unit 20 during playback, fixes the display in the active display window W2 to the active display frame at that point in time.

The frame advance button T3 and the frame reverse button T4 respectively receive instructions from the user to switch the active display frame to the next frame or the previous frame along the timeline of the active file group.

The timeline bar T5 diagrammatically represents the timeline of the active file group. The timeline bar T5 is equally partitioned, in the direction in which the bar extends, into the number of frames of the active file group. An nth partitioned area from the left on the timeline bar T5 corresponds to an nth frame on the timeline of the active file group (where n is a natural number).

As shown in FIG. 3, the timeline bar T5 displays a partitioned area A1 corresponding to a selected frame group in a different mode to a partitioned area A2 corresponding to a non-selected frame group. A selected frame group is a frame group corresponding to a segment that is currently selected on the timeline of the active file group. A non-selected frame group is a frame group corresponding to a segment that is currently not selected on the timeline of the active file group. Note that in the case where there is one frame, that frame will simply be referred to a selected frame or a non-selected frame. In the present embodiment, the area A1 is displayed with a light color and the area A2 is displayed with a dark color. The abovementioned image selection receiving unit 41 receives selection of an arbitrary frame on the timeline of the active file group from the user via the timeline bar T5. For example, when an arbitrary position of the timeline bar T5 has been selected with a mouse, a frame image corresponding to this position is displayed on the active display window W2. Also, in the case where an arbitrary range of the timeline bar T5 is selected, the frame image at the end point of the selected range is displayed on the display window W2.

2-3. Image Processing

Hereinafter, image processing on a selected frame group will be described. Here, image processing for converting a change between images in an image frame group into a graph is performed. The abovementioned image selection receiving unit 41, difference value pattern receiving unit 42, image processing unit 43, area designation receiving unit 44 and color designation receiving unit 45 are capable of executing an image processing module for performing graph generation processing. The image processing module is incorporated in the image processing program 2.

Figure 4:
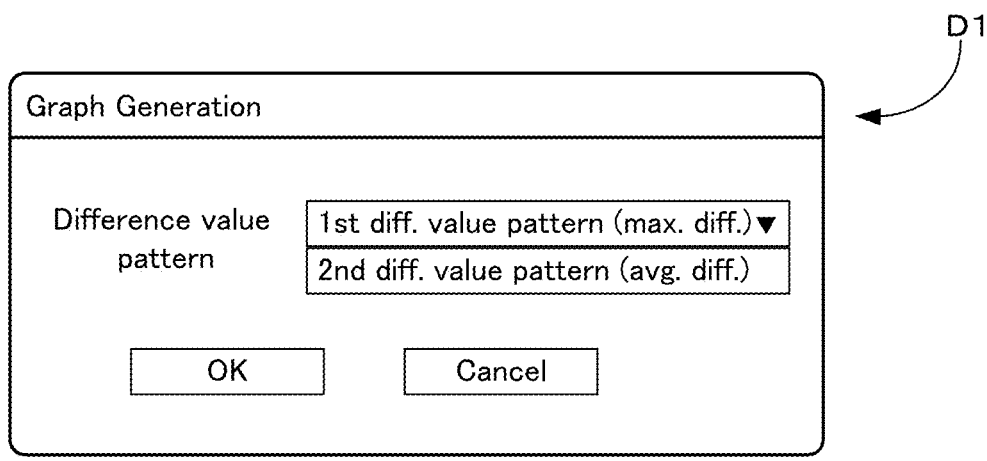
FIG. 4 is a diagram showing a dialog box for inputting a difference value pattern.

The user selects a frame group to be targeted for image processing on the timeline by operating the basic screen W1 via the input unit 20. At this time, it is also naturally possible to select all the frames on the timeline as processing targets. This frame group serves as the abovementioned selected frame group. The image selection receiving unit 41, on detecting an operation by the user selecting a selected frame group, stores information indicating which of the frames was selected in the selected frame group area 52. The user thus starts image processing with the selected frame group in a selected state. First, the difference value pattern receiving unit 42, on detecting that image processing for generating a graph was selected from the pull-down menu of the basic screen W1 or the like, displays a dialog box D1 as shown in FIG. 4, and allows the user to input which difference value to generate. This difference value is for calculating the change between frame images, with a first difference value serving as a default, and a second difference value being selectable using a pull-down menu. Here, each difference value will be described.

(1) First Difference Value

Figure 5:
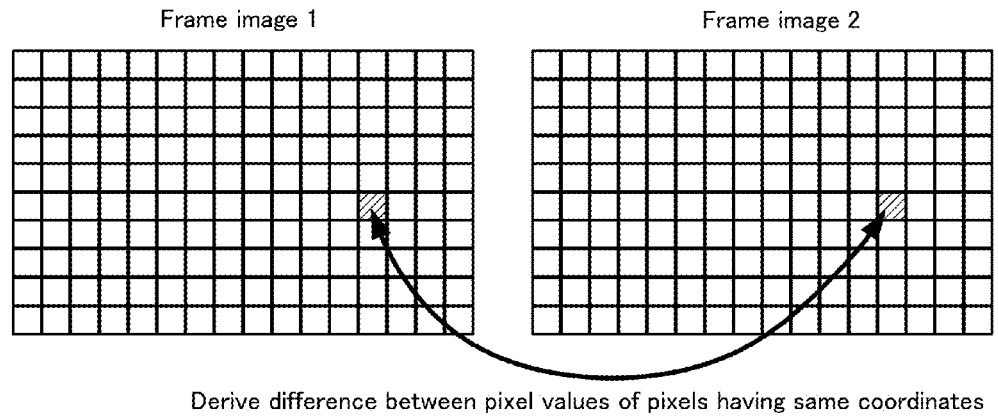
FIG. 5 is a schematic view illustrating a method of calculating a difference value.

As shown in FIG. 5, first, the pixel values of pixels at corresponding positions (coordinates) in a frame image 1 and a frame image 2 which are adjacent frame images are extracted, and the differences therebetween are derived. The differences are assumed to be absolute values. The largest difference after deriving the differences for all the coordinates is taken as a first difference value between the adjacent frame images. The first difference value is effective when extracting a case such as where part of adjacent frame images changes.

(2) Second Difference Value

Similarly to the first difference value, first, the pixel values of corresponding positions (coordinates) in adjacent frame images are extracted, and the differences (absolute values) therebetween are derived. An average value of these differences obtained after deriving the differences for all the coordinates is taken as the second difference value. The second difference value is effective in a case such as where a change occurs throughout the entire image, even if there is only a slight change between adjacent frame images.

Figure 6:
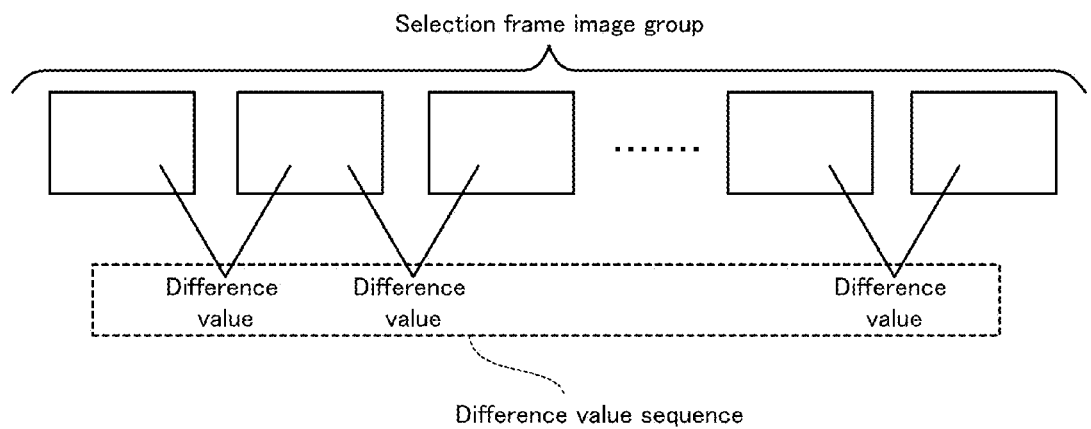
FIG. 6 is a schematic view illustrating a method of calculating a difference value.
Figure 7:
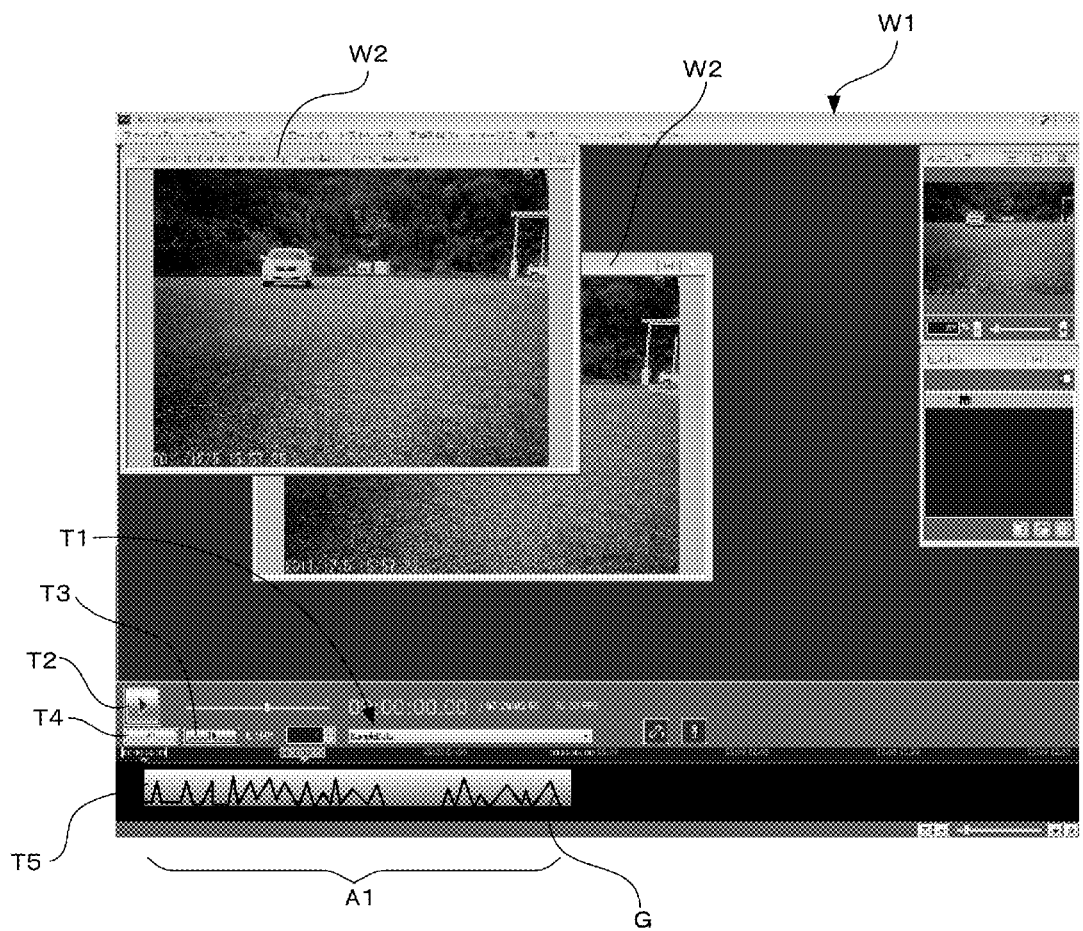
FIG. 7 is a diagram in which an image change graph is displayed on the basic screen of FIG. 2.
Figure 8A:
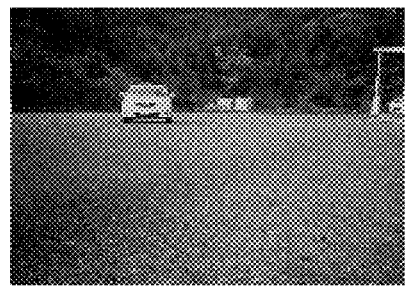
FIGS. 8A to 8L are diagrams showing an example of a timeline.
Figure 8B:
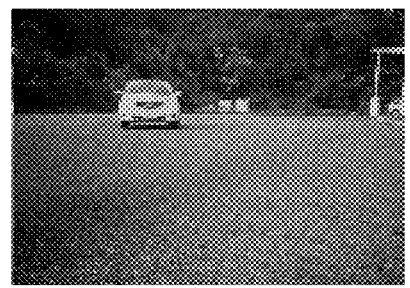
Figure 8C:
Figure 8D:
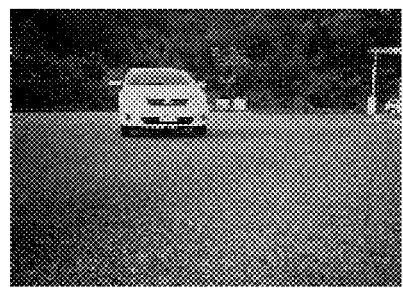
Figure 8E:
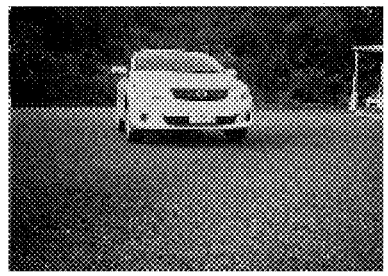
Figure 8F:
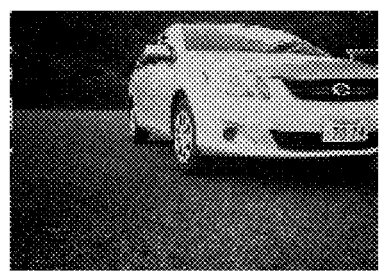
Figure 8G:
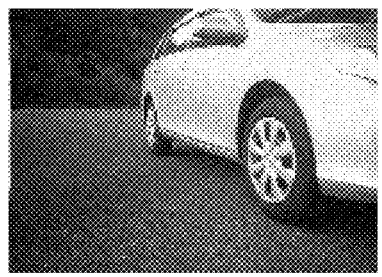
Figure 8H:
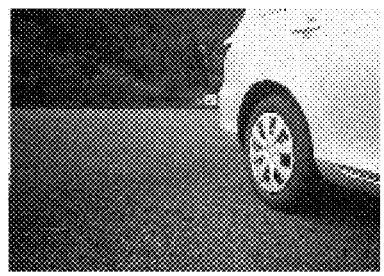
Figure 8I:
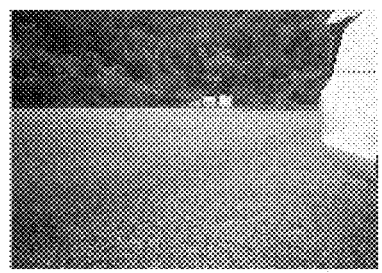
Figure 8J:
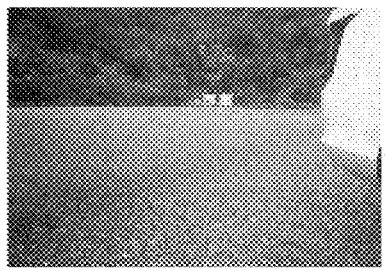
Figure 8K:
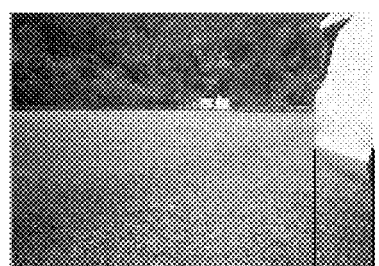
Figure 8L:
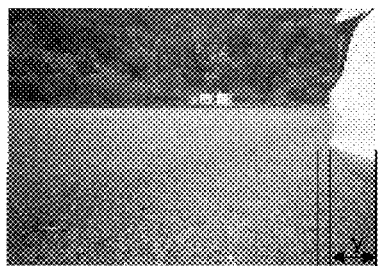

When one of the difference value patterns has been selected in the dialog box D1 and the OK button has been clicked, the image processing unit 43 starts processing. The image processing unit 43 calculates the difference value between adjacent frame images in the selected frame group, as shown in FIG. 6, in accordance the selected difference value pattern. The calculated difference values are then arranged in time series to generate a difference value sequence, and this sequence is stored in the difference value area 53 of the storage unit 30. Next, the image processing unit 43 draws an image change graph from the calculated difference value sequence. That is, as shown in FIG. 7, the image processing unit 43 draws an image change line graph G so as to be superimposed on the timeline bar T5 of the basic screen W1. Note that, in this example, the selected frame group A1 targeted for processing consists of all the frames on the timeline.

In this graph, positions in the vertical direction of the timeline bar T5 represent the difference values. That is, the graph is drawn higher above the timeline bar T5 as the difference value increases. On viewing this graph, it is evident that portions indicating a high value are timeslots where a large change occurs between frame images. When the user viewing the image change graph G selects (e.g., clicks with a mouse) a place on the timeline bar T5 corresponding to a large change, the frame image corresponding to that place is displayed on the display window W2. Accordingly, it is possible for the user to select only places where there is a large change and to check the change in the image.

Figure 9A:
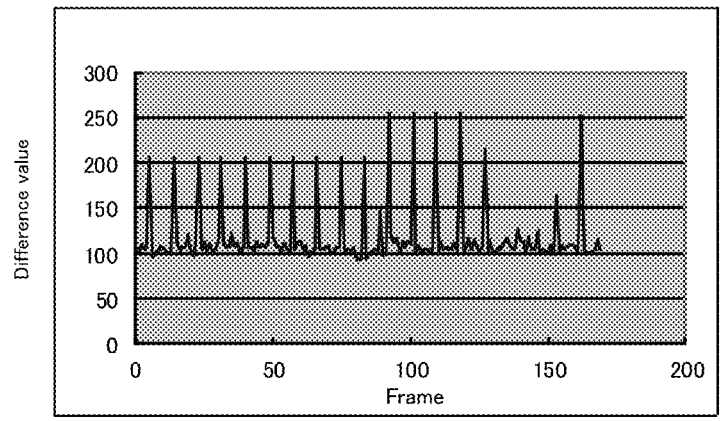
FIGS. 9A and 9B show exemplary image change graphs.
Figure 9B:
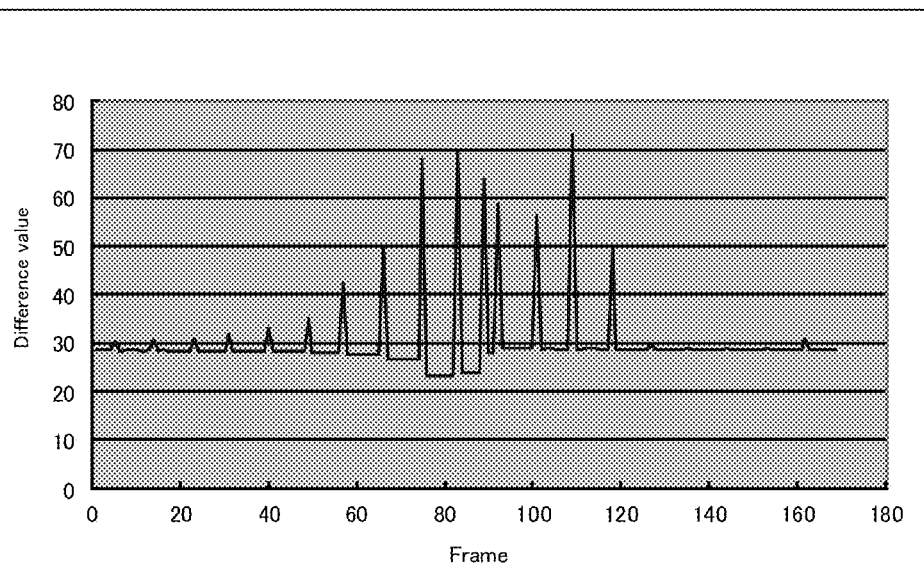

Here, an example of abovementioned image processing will be shown. FIGS. 8A to 8L show part of a timeline constituted by 180 frame images. FIGS. 8A to 8L are, as illustrated, frame images captured roughly every 0.5 seconds from the start. An example in which the abovementioned image processing is performed on the entire timeline is shown in FIGS. 9A and 9B. FIG. 9A is an image change graph generated using the first difference value, and FIG. 9B shows an image change graph generated using the second difference value. Note that while the difference values are greater than or equal to a given value in both graphs, this is conceivably due to the frame images containing noise. As shown in FIGS. 8A to 8L, a moving image in which a car gradually approaches is shown by this timeline. The size of the car in the image changes gradually rather than significantly for about the first 1.5 seconds from the start, but then after about 2 seconds the car occupies a large proportion of the image and the size of the car also changes significantly. Also, although there is almost no change in the image after 4 seconds from the start, the image changes in a very short period of time from 5 seconds to 5.5 seconds (change between FIG. 8K and FIG. 8L (see x, y)).

In the case where the first difference value shown in FIG. 9A is used, peaks occur at roughly the same difference value, with these peaks appearing uniformly up until about the 130th frame, after which a peak of similar size appears near the 160th frame. This indicates that the first difference value detects not only large changes but also small changes occurring in part of the frame images. That is, this indicates that behavior including slight changes on the screen was detected, namely, the car approaching gradually (approx. 0-2 sec: up to 80th frame), and then, after moving significantly on the screen (approx. 2-4 sec: 80-130th frames), stopping (approx. 4-5 sec: 130-150th frames), before moving slightly at the end (approx. 5-5.5 sec: 150-160th frames). On the other hand, in the case where the second difference value shown in FIG. 9B is used, the peaks in the difference value, appear where the abovementioned large motion of the car occurs (approx. 2-4 sec: 80-130th frames). That is, in the case of using the second difference value based on the average of difference values, change that occurs in large areas is detected, while change that occurs in small areas of the frame images is more difficult to detect.

Accordingly, based on the above results, in the case where the first difference value is used, slight changes that occur in part of an image can be represented as a graph, and in the case where the second difference value is used, changes that occur in a large portion of an image can be represented as a graph, even if degree of change is small, for example.

3. Features

As described above, according to the present embodiment, difference values based on the differences between the pixel values of images on a timeline that are adjacent in time series are derived, and the image change graph G showing the change in difference values is displayed by arranging these difference values in time series. Thus, places where there is a large change between images can be easily spotted on the timeline. Accordingly, by checking images having places where there is a large change in difference values in the image change graph G, it is possible to easily detect only places where there is a large change between images on the timeline. As a result, even with a moving image spanning an extended period of time, places where a change occurs can be easily detected in the moving image, and the workload can be reduced. For example, the present invention is particularly advantageous when analyzing an image that spans an extended period of time, such as a moving image captured by a security camera, with the image processing apparatus (image processing program) according to the present embodiment, and it is possible to easily extract only places where a change occurs in the moving image, without checking the full recording time.

4. Variations

Although an embodiment of the present invention has been described above, the present invention is not limited to the above embodiment, and various modifications are possible within a scope that does not deviate from the gist of the invention. For example, the following modifications are possible.

4-1

Although a line graph is used as the image change graph G in the above embodiment, in terms of a time-series difference image according to the present invention, the method of displaying a change in difference values is not particularly limited. For example, any graph that enables changes in difference values to be spotted may be employed, such as a bar graph or a dot graph. Also, other than a graph, it is possible to arrange only numerical values in time series, or, other than actual numerical values, it is possible, for example, for the degree of change to be displayed in a stepwise manner, or to be displayed with a graph or numerical numbers.

4-2

Figure 10:
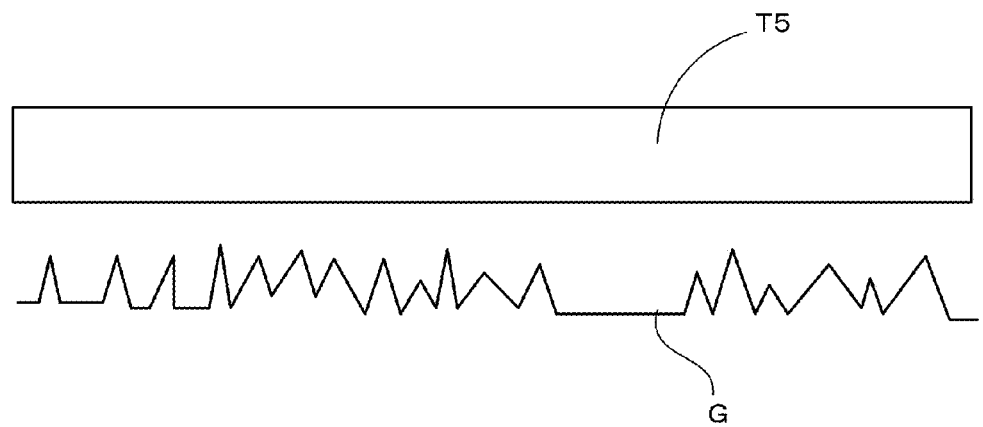
FIG. 10 is a diagram showing another example of a method of displaying an image change graph.
Figure 11:
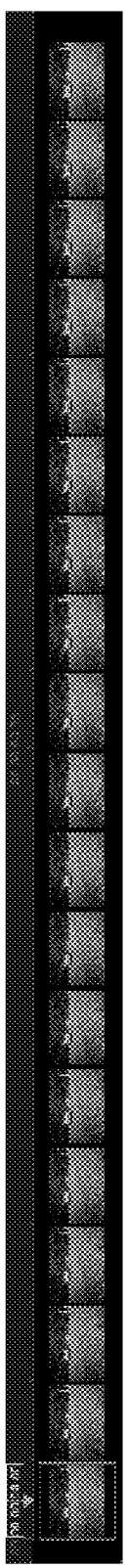
FIG. 11 is a diagram showing another example of a timeline bar.

Also, although the change in difference values is displayed on the timeline in the above embodiment, the timeline bar T5 and the image change graph G can also be displayed adjacent to each other, as shown in FIG. 10, for example. Alternatively, it is possible to display only the image change graph G at a position distanced from the timeline bar T5, if only the change in difference values is read. Note that although a timeline bar serves as the timeline image according to the present invention and is a bar-like image corresponding to the timeline, a mode in which frame images are arranged in order, as shown in FIG. 11, may be used as the timeline image. In addition, the form of display is not particularly limited, as long as a configuration is adopted such that when an input selecting an arbitrary position is received in correspondence with the timeline, an image on the timeline corresponding to that position is displayed.

4-3

Although direct numerical values obtained from differences in pixel values are used as difference values in the above embodiment, the present invention is not limited thereto, and obtained differences in pixel values can be suitably processed. For example, values relative to a predetermined numerical value may be used rather than absolute numerical values. The same also applies when generating a graph, and a graph can also be generated using values relative to a predetermined numerical value, apart from directly using the difference value sequence.

4-4

Figure 12A:
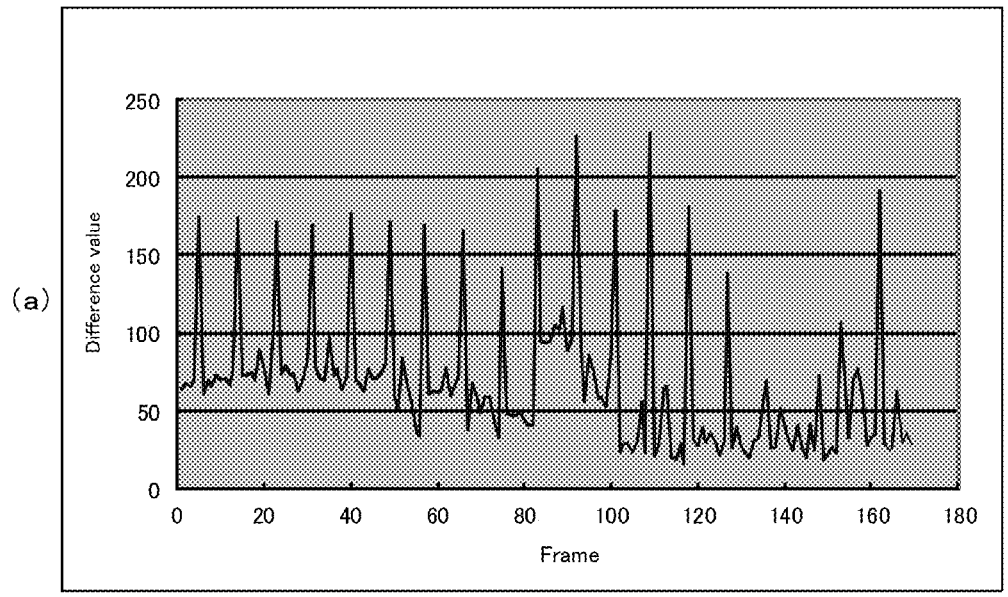
FIGS. 12A and 12B are schematic views illustrating another example of image averaging processing of FIG. 5.
Figure 12B:
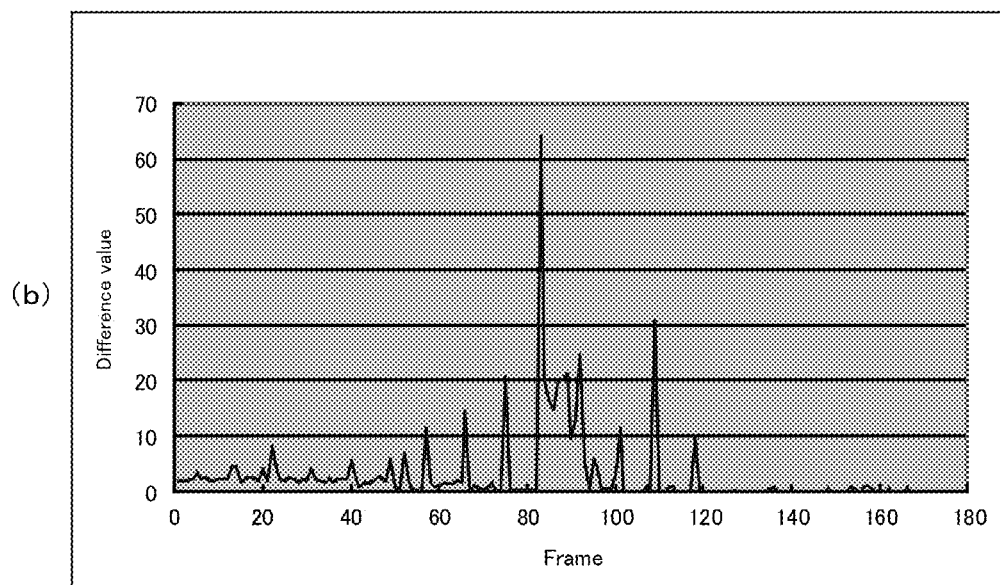

Although two examples were shown as difference value patterns in the above embodiment, the present invention is not limited thereto as long as difference values between frame images can be derived. Denoising can also be performed in generating a graph. For example, difference values can also be derived after removing granular noise from each frame image, as described in JP 2010-33527A, JP 2010-87769A and JP 2010-14135A. Thereby, the difference value can be approximated to zero if there is no change between frame images, and places where there is change can be visualized more prominently. FIGS. 12A and 12B are graphs created from difference value sequences that have been subject to noise rejection processing. FIG. 12A corresponds to FIG. 9A, and FIG. 12B corresponds to FIG. 9B. In both graphs the difference value approaches zero, in the case where there is little change between frame images, and reading of change is facilitated.

4-5

Figure 13:
FIG. 13 is a diagram showing an example of a frame image.

Incidentally, characters that change over time may be included in the image constituting the timeline. For example, image capture time is often included in the image captured by a security camera, as shown in FIG. 13. In this case, when the change in characters is judged in the image processing program to be a difference, changes between images that should originally have been extracted could possibly not be correctly recognized. Thus, settings can be configured so as to eliminate characters that change over time, such as image capture date and time, as well, as other signs or graphics that change from the image processing area in advance, either automatically or by a manual operation by the user. At this time, it is possible for characters or the like to be automatically recognized and for only the characters or the like to be eliminated, or for an arbitrary area in which the characters or the like are included, to be eliminated.

4-6

Although entire frame images are targeted for image processing in the above embodiment, an image processing area can be set to an arbitrary area that is specified by the user. For example, the area designation receiving unit 44 may receive designation, from the user, of an area of an image on which to perform image processing. The image processing unit 43 may derive difference values in the designated area of the image.

Figure 14:
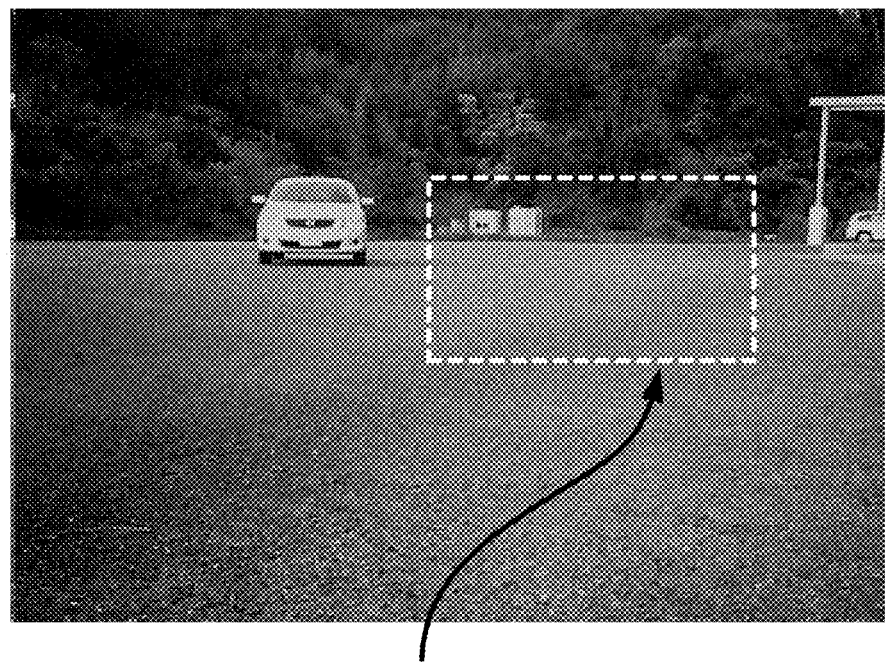
FIG. 14 is a diagram showing another example of image processing.

To give a specific example, the area designation receiving unit 44 receives designation of an arbitrary area in a frame image, according to an operation by the user via the input unit 20, as shown in FIG. 14, prior to image processing. The image processing unit 43 then derives the abovementioned difference values, targeting pixels in the area received by the area designation receiving unit 44. Thereby, an image change graph G of only the area specified by the user can thereby be generated.

4-7

Also, in the case of analyzing an image based on the image change graph G, apart from manually selecting frame images with a large difference value as mentioned above, it is possible to only extract frame images having a difference value greater than or equal to a predetermined value. For example, it is possible to automatically select (search for) and display only frame images having a difference value greater than or equal to a predetermined value, or collectively save only frame images such as these. At this time, not only the selected frame image but frame images neighboring the selected frame image can also be extracted.

4-8

Also, in the above embodiment, the type of image included in the active file group that can be targeted for image processing is not limited. Images included in the active file group may be color images or black and white images. In the case where the images included in the active file group are provided by color images, the image processing unit 43 may derive the abovementioned difference value without focusing on a specific color, or may derive the abovementioned difference value by focusing on a specific color. In the case where the images included in the active file group are provided by color images, the pixel values of the image may have a plurality of color components, such as an R (red), G (green) and B (blue) components and C (cyan) M (magenta) and Y (yellow) components, for example. Hereinafter, a specific example of derivation of difference values is shown, taking the case where pixel values have RGB components as an example.

Figure 15:
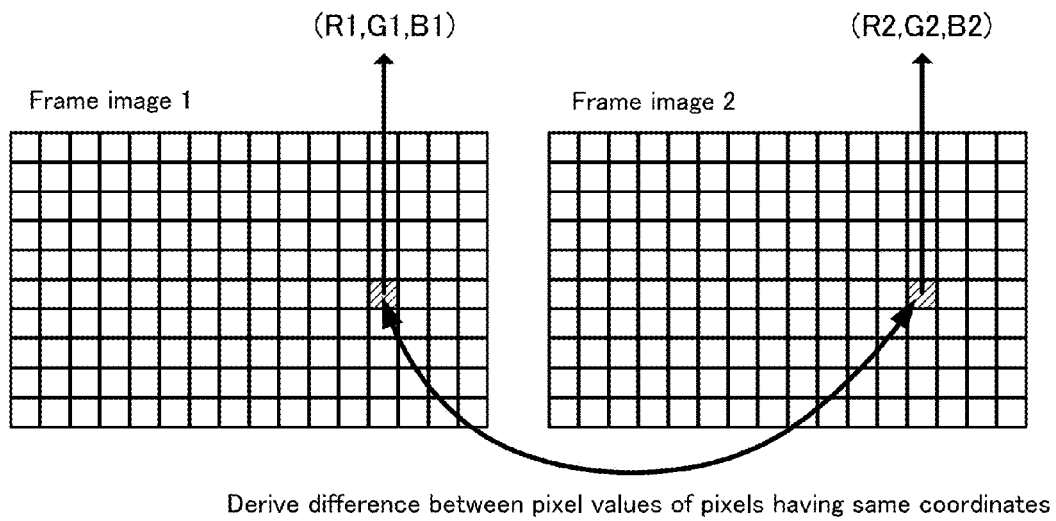
FIG. 15 is a schematic view illustrating a method of calculating a difference value.

FIG. 15 illustrates a frame image 1 and a frame image 2 that are adjacent frame images, similarly to FIG. 5. As shown in FIG. 15, the pixel values 1 (R1, G1, B1) of the frame image 1 and the pixel values 2 (R2, G2, B2) of the frame image 2 are assumed to be the pixel values of pixels at corresponding positions (coordinates) in the frame image 1 and the frame image 2.

Derivation of Difference Values without Focusing on a Specific Color

The image processing unit 43, in the case of deriving the abovementioned difference value without focusing on a specific color, may derive a difference S (absolute value), utilizing a color component having the largest difference in values among the RGB components as shown in equation (1), for example. Note That in equation (1), ∥ denotes an absolute value, and max{a, b, c} denotes the maximum value among a, b and c.

$$\text{Difference } S = \max\{|R1-R2|, |G1-G2|, |B1-B2|\} \quad \text{Equation (1)}$$

The image processing unit 43 may, after deriving differences S shown by equation (1) for all coordinates, specify a largest difference $S_{max}$, as the abovementioned first difference value between adjacent frame images. Alternatively, the image processing unit 43 may, having derived differences S shown by equation (1) for all the coordinates, calculate a value $S_{ave}$ obtained by averaging the differences S for all the coordinates, as the abovementioned second difference value between adjacent frame images.

Also, the image processing unit 43 may as another method, derive the difference S, utilizing the total of the differences (absolute values) of the respective RGB components as shown in equation (2), for example. Then, the image processing unit 43 may, after deriving the differences S for all the coordinates, specify the largest difference $S_{max}$ as the first difference value, and calculate a value $S_{ave}$ obtained by averaging the differences S for all the coordinates as the second difference value, similarly to above description.

$$\text{Difference } S = |R1-R2| + |G1-G2| + |B1-B2| \quad \text{Equation (2)}$$

Also, the image processing unit 43 may, as another method, derive the difference S utilizing the distance between two pixel values as shown in equation (3), for example. Then, the image processing unit 43 may, after deriving the differences S for all the coordinates, specify the largest difference $S_{max}$ as the first difference value, or calculate a value $S_{ave}$ obtained by averaging the differences S for all the coordinates as the second difference value, similarly to the above description.

$$\text{Difference } S = \sqrt{(R1-R2)^2 + (G1-G2)^2 + (B1-B2)^2}$$

Derivation of Difference Value by Focusing on a Specific Color

The image processing unit 43, in the case of deriving the abovementioned difference value by focusing on a specific color, is able to derive the first difference value and the second difference value, by using only the values of a specific color component relating to the specific color, and deriving the difference S of one of the abovementioned equations 1 to 3, for example. Note that in the case of deriving the difference S using only the values of one type of color component, the respective differences S of equations (1) to (3) will be the same as the difference in the values of that color component.

However, in the case of deriving the difference values using only the values of a specific color component, elements other than the color being focused on may be included. For example, in the case of deriving difference values focusing; on red, difference values will be derived without distinguishing between white (255, 255, 255), red (255, 0, 0), yellow (255, 255, 0) and magenta (255, 0, 255) when the difference value is derived using only the values of the R component, and elements apart from red may also be included in the color that is focused on in order to derive the difference values. Also the values of a plurality of color components included in the pixel values may indicate similar changes to each other.

In order to deal with these cases, the image processing unit 43 may derive the difference values so as to reduce the influence of elements apart from the specific color, and eliminate portions commonly included in the respective color components that are included in the pixel values. Hereinafter, a method used by the image processing unit 43 to calculate difference values in such a case will be illustrated. Note that, in the following examples, it is assumed that the image processing unit 43 handles the colors red (P), green (G) and blue (B) in order to derive difference values.

The image processing unit 43 first performs the conversion shown in equation (4), in order to reduce the influence of the elements of colors apart from the respective colors red (B), green (H) and blue (B) and eliminate portions commonly included in the color components, when the pixel values of frame images are set to (B, G, B).

$$\begin{cases} Ra = \begin{cases} R - B/2.0 - G/2.0 & (R - B/2.0 - G/2.0 > 0) \\ 0 & (R - B/2.0 - G/2.0 \le 0) \end{cases} \\ Ga = \begin{cases} G - R/2.0 - B/2.0 & (G - R/2.0 - B/2.0 > 0) \\ 0 & (G - R/2.0 - B/2.0 \le 0) \end{cases} \\ Ba = \begin{cases} B - G/2.0 - R/2.0 & (B - G/2.0 - R/2.0 > 0) \\ 0 & (B - G/2.0 - R/2.0 \le 0) \end{cases} \end{cases} \quad \text{Equation (4)}$$

At this point in time, the difference between the pixel values of corresponding position in adjacent frame images has not yet been taken into consideration. In view of this, when description is given taking the abovementioned frame image 1 and frame image 2 as an example, the image processing unit 43 derives the difference S for each pixel, using pixel values that have not been subject to the conversion of equation (4) with a method using one of the abovementioned equations 1 to 3, as the difference between the pixel values of corresponding positions in adjacent frame images. The image processing unit 43 then derives the differences (Rb, Gb, Bd) relating to red, green and blue for the pixel values of corresponding positions in adjacent frame images, by applying S as a rate of change to (Ra, Ga, Ba) derived for each pixel of the frame image 2, as shown in equation (5). In equation (5), S/255 shows the rate of change in the differences between the pixel values of corresponding positions in frame images. In equation (5), the range of values that S can take is assumed to be 0 to 255. Note that abovementioned $S_{max}$ may be used instead of the difference S.

$$\begin{cases} Rb = Ra \times \dfrac{S}{255} \\ Gb = Ga \times \dfrac{S}{255} \\ Bb = Ba \times \dfrac{S}{255} \end{cases} \quad \text{Equation (5)}$$

The image processing unit 43 may then acquire, as the first difference value, the maximum value among the differences Rb derived for each pixel of the frame image 2, as difference values derived by focusing on red, in the case where red is designated as the specific color to be focused on in order to derive the difference values. Also, the image processing unit 43 may acquire, as the second difference value, the average value of the differences Rb derived for each pixel of the frame image 2, as difference values derived by focusing on red. The same applies to green and blue.

Also, the image processing unit 43 may use the pixel values of a designated color as a reference, in order to derive difference values by focusing on a specific color. A specific example of the derivation of difference values is shown below in the state shown in FIG. 15 where adjacent frame images are provided, assuming that the colors of the pixel values (RX, GX, BX) have been designated.

The image processing unit 43 derives the distances (scalar values) between pixel values of the designated color and the pixel values 1 and 2 respectively, with the same method as equation (3) for example. Next, the image processing unit 43 derives the differences of she distances between the pixel values of the designated color and the respective pixel values of the adjacent frame images. The image processing unit 43 may then derive the first difference value or the second difference value, using a similar method to that described above, as difference values derived on the basis of the pixel values of the designated color.

The image processing unit 43 derives the difference between the pixel value 1 and the pixel value 2, with one of the methods described using equations (1) to (3), in the case where the pixel value 1 or the pixel value 2 is the same as or approximates a designated pixel value, for example. On the other hand, the image processing unit 43 set the difference between the pixel value 1 and the pixel value 2 to zero if neither the pixel value 1 nor the pixel value 2 is the same as or approximates the designated pixel value. The image processing unit 43 may then derive the first difference value or the second difference value, using a similar method to that described above, after deriving the differences for all the coordinates, as a difference value derived on the basis of the pixel values of the designated color.

Also, the image processing unit 43 may, as shown in equation (6), derive the difference S between the pixel value 1 and the pixel value 2, by utilizing each color component of the pixel values of the designated color as specific gravity. The image processing unit 43 may then, after deriving the differences for all the coordinates, derive the first difference value or the second difference value, using a similar method to that described above, as difference values derived on the basis of the pixel values of the designated color.

$$\text{Difference } S = |R1 - R2| \times \dfrac{|R1 - RX|}{255} + |G1 - G2| \times \dfrac{|G1 - GX|}{255} + |B1 - B2| \times \dfrac{|B1 - BX|}{255} \quad \text{Equation (6)}$$

Also, the image processing unit 43 may derive difference values from hue or saturation-chroma. The image processing unit 43 derives X and Y that are shown by equation (7), using (R, G, B) as the pixel values of the frame images. Note that hue H and the saturation-chroma S are represented by X and Y, as shown in equation (8).

$$\begin{cases} X = R \times \cos 0 + G \times \cos \dfrac{2}{3}\pi + B \times \cos \dfrac{4}{3}\pi \\ Y = R \times \sin 0 + G \times \sin \dfrac{2}{3}\pi + B \times \sin \dfrac{4}{3}\pi \end{cases} \quad \text{Equation (7)}$$

$$\begin{cases} H = \arctan\left(\dfrac{Y}{X}\right) \\ S = \sqrt{X^2 + Y^2} \end{cases} \quad \text{Equation (8)}$$

Here, when X and Y that are derived from the pixel values of the frame image 1 are respectively set to X1 and Y1, and X and Y that are derived from the pixel values of the frame image 2 are respectively set to X2 and Y2, the hue difference dH and the saturation-chroma difference dS are represented by equation (9).

$$\begin{cases} dH = \arctan\left(\dfrac{Y1-Y2}{X1-X2}\right) \\ dS = \sqrt{(X1-X2)^2 + (Y1-Y2)^2} \end{cases} \quad \text{Equation (9)}$$

In view of this, the image processing unit 43 may derive the maximum value of the differences dH or dS derived for each pixel of the frame image as the first difference value, or may derive the average value of the differences dH or dS derived for each pixel of the frame image as the second difference value. An HSV model using hue and saturation-chroma is a color model that approximates human feeling. Thus, by deriving difference values in this way, an image change graph that better reflects human feeling can be obtained, compared with the case where an RGB model is used.

Difference values may also be derived by any of the methods described above. The method of deriving difference values is appropriately set. For example, the method of deriving difference values may be set by the color designation receiving unit 45 receiving selection, from the user, of a color to be focused on in order to derive difference values.

Also, the method of deriving difference values may be set by the color designation receiving unit 45 receiving selection, from the user, of whether to focus on a specific color in order to derive difference values. Note that, in the case, the color designation receiving unit 45 receives designation of a specific color to be focused on in order to derive difference values from the user, either when the user selects to focus on a specific color or after the user selects to focus on a specific color.

Figure 16:
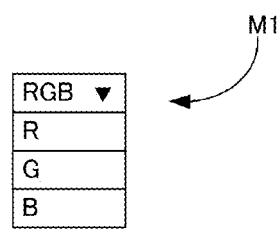
FIG. 16 is a diagram illustrating a pull-down menu for receiving a color designation.

FIG. 16 illustrates a pull-down menu displayed on the display 10, in order for the color designation receiving unit 45 to receive selection, from the user, of whether to focus on a specific color in order to derive difference values. Note that the pull-down menu may be incorporated into part of the basic screen W1. The item "RGB" in the pull-down menu corresponds to selecting "not to focus on a specific color in order to derive difference values". Also, the items "R", "G" and "B" in the pull-down menu correspond to designating "red", "green" or "blue" as a specific color to be focused on in order to derive difference values.

4-9

Figure 17:
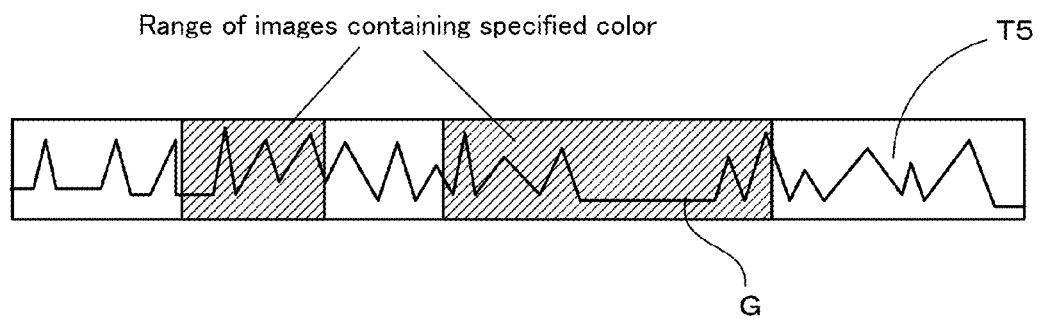
FIG. 17 is a diagram showing another example of a timeline image.

Also, the color designation receiving unit 45 may receive designation of a color from the user. In this case, the image processing unit 43 may generate a timeline bar T5 (timeline image) that shows the range over which images containing pixels of the designated color exists on the timeline. FIG. 17 shows an example of such a timeline image. In this case, for example, the image processing unit 43 determines whether pixels of the specified color are included in the images included in the active file group, specifies the range over which images containing pixels of the designated color exists on the timeline, and generates a timeline bar T5 that clearly shows the specified range. As a result, the user is able to check whether the designated color exists as well as checking for changes between images.

4-10

Note that, in the present embodiment, an example was described in which a moving image file is imported as a still image file group, and image processing is performed on the still image files included in the still image file group. However, the image processing target is not limited to the still image file group, and may be the moving image file itself.

Here, the moving image file may include frames that have been encoded using inter-frame prediction, other than frames that are similar to still image files. In such a case, the image processing unit 43 may calculate the difference values between adjacent frame images, using frame images obtained by decoding this moving image file.

An object of the present embodiment is to provide an image processing program and an image processing apparatus that enable places where changes occur in a moving image to be easily detected, even when the moving image spans an extended period of time. As described above, according to the present embodiment, places where changes occur can be easily detected in a moving image, even when the moving image spans an extended period of time.

The invention claimed is:

1. A non-transitory computer-readable medium storing an image processing program to make a computer execute image processing on an image group on one timeline, the image processing program making the computer execute:
    deriving a difference value based on a difference between pixel values of images that are adjacent in time series in the image group, the difference value indicating a degree of change between the images that are adjacent in the time series, wherein the difference value is selectable by a user from a first difference value and a second difference value, the first difference value indicative of a largest difference between the pixel values of a plurality of corresponding positions in the adjacent images and the second difference value indicative of an average value obtained by deriving the difference between the pixel values of the plurality of corresponding positions in the adjacent images and averaging the differences of all the positions;
    receiving a selection of one of the first difference value and the second difference value from the user; and
    displaying a time-series difference image showing a time-series change in the selected difference value,
    wherein the image processing program further makes the computer execute:
    displaying a timeline image corresponding to the timeline and in time series; and
    displaying, when an input selecting an arbitrary position on the timeline image is received, an image on the timeline corresponding to the selected position, and
    wherein, in the display of the time-series difference image, the time-series difference image is displayed so as to correspond to the timeline image and in time series.

2. The non-transitory computer-readable medium storing an image processing program according to claim 1,
    wherein the image processing program further makes the computer execute receiving designation of a color from a user, and
    a range over which images containing a pixel of the designated color exist on the timeline is shown on the timeline image.

3. The non-transitory computer-readable medium storing an image processing program according to claim 1,
    wherein the time-series difference image is represented by a graph.

4. The non-transitory computer-readable medium storing an image processing program according to claim 1,
    wherein the image processing program further makes the computer execute receiving designation, from a user, of an area on which to perform the image processing in an image, and the difference value in the area of the designated image is derived.

5. The non-transitory computer-readable medium storing an image processing program according to claim 1,
wherein if images included in the image group are provided by color images, the difference value is derived without focusing on a specific color.

6. The non-transitory computer-readable medium storing an image processing program according to claim 1,
wherein if images included in the image group are provided by color images, the difference value is derived by focusing on a specific color.

7. The non-transitory computer-readable medium storing an image processing program according to claim 1,
wherein if images included in the image group are provided by color images, the image processing program further makes the computer execute receiving selection, from a user, of a specific color to be focused on in order to derive the difference value, and
the difference value is derived by focusing on the selected specific color.

8. The non-transitory computer-readable medium storing an image processing program according to claim 1,
wherein if images included in the image group are provided by color images, the image processing program further makes the computer execute receiving selection, from a user, of whether to focus on a specific color in order to derive the difference value, and
if selection indicating not to focus on a specific color in order to derive the difference value is received, the difference value is derived without focusing on a specific color, and if selection indicating to focus on a specific color in order to derive the difference value is received, the difference value is derived by focusing on a specific color that is designated by the user in the received selection.

9. An image processing apparatus for performing image processing on an image group on one timeline, comprising:
a control unit embodied in hardware including an image processor that:
derives a difference value based on a difference between pixel values of images that are adjacent in time series in the image group, the difference value indicating a degree of change between the images that are adjacent in the time series, wherein the difference value is selectable by a user from a first difference value and a second difference value, the first difference value indicative of a largest difference between the pixel values of a plurality of corresponding positions in the adjacent images and the second difference value indicative of an average value obtained by deriving the difference between the pixel values of the plurality of corresponding positions in the adjacent images and averaging the differences of all the positions;
receives a selection of one of the first difference value and the second difference value from the user; and
generates a time-series difference image showing a time-series change in the selected difference value; and
a display that:
displays the time-series difference image,
displays a timeline image corresponding to the timeline and in time series; and
displays, when an input selecting an arbitrary position on the timeline image is received, an image on the timeline corresponding to the selected position,
wherein, in the display of the time-series difference image, the time-series difference image is displayed so as to correspond to the timeline image and in time series.

10. The image processing apparatus according to claim 9,
wherein the control unit further receives a designation of a color from a user, and
wherein a range over which images containing a pixel of the designated color exist on the timeline is shown on the timeline image.

* * * * *